(12) United States Patent
Razzell

(10) Patent No.: US 6,718,774 B2
(45) Date of Patent: Apr. 13, 2004

(54) FASTENER

(75) Inventor: Anthony G Razzell, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/246,698

(22) Filed: Sep. 19, 2002

(65) Prior Publication Data

US 2003/0123953 A1 Jul. 3, 2003

(30) Foreign Application Priority Data

Oct. 1, 2001 (GB) .............................................. 0123504

(51) Int. Cl.⁷ ................................................. F02C 7/20
(52) U.S. Cl. ........................................... 60/798; 60/753
(58) Field of Search ........................... 60/796, 798, 753

(56) References Cited

U.S. PATENT DOCUMENTS 6,042,315 A * 3/2000 Miller et al. ................. 411/411
6,490,868 B1 * 12/2002 Bunce et al. ................. 60/803

FOREIGN PATENT DOCUMENTS

JP 3-117780 P 5/1999

* cited by examiner

*Primary Examiner*—Ehud Gartenberg
(74) *Attorney, Agent, or Firm*—W. Warren Taltavull; Manelli, Denison & Selter PLLC

(57) ABSTRACT

A fastener (31) is disclosed for a first article, for example a tile (29), to a second article for example an outer wall (27) of a wall structure (21, 22) of a combustor (15) of a gas turbine engine (10). The fastener (31) comprises an elongate main part, which may be in the form of a bolt (34). The main part can extend through the first and second articles. The main part defines a cooling pathway (46) therethrough to allow the passage of a cooling gas through the main part.

20 Claims, 4 Drawing Sheets

FASTENER

This invention relates to fasteners. More particularly but not exclusively, the invention relates to fasteners for fastening wall elements to wall structures of gas turbine engine combustors.

The designers of gas turbine engine combustors are required to meet stringent emission targets. This means that the temperatures within the combustors will need to increase, as cooling air is diverted to the inside of the combustor to control emissions.

The present combustors are formed with a tiled inner wall, but such tiles have a maximum temperature threshold of about 1150° C.

According to one aspect of this invention, there is provided a fastener for fastening a first article to a second article at least the first article being in an elevated temperature environment, the fastener comprising an elongate main part which can extend through the first and second articles, wherein the main part defines a cooling pathway therethrough to allow the passage of a cooling gas through the main part.

Preferably, the cooling aperture extends lengthways through the said main part.

In the preferred embodiment, the main part comprises a shank and a head. The pathway may extend through the shank and through the head.

According to another aspect of this invention, there is provided a fastener comprising a main part having a head and a shank wherein a pathway is defined through the head and shank to allow the passage of a gas through the main part.

The pathway may be in the form of an aperture extending through the main part.

The shank is preferably formed to cooperate with a further part to secure the second article to the main part. The shank may be threaded and the further part may be a nut.

Preferably, the main part comprises a bolt.

The preferred embodiment is particularly suitable for use in fastening a first article which may be in the form of a main body of a wall element to a second article which may be in the form of wall of a gas turbine engine combustor. The main body may be in the form of a wall tile. The main body may be formed of a ceramic material.

Preferably the head can engage the first article which may be generally planar in configuration. The first article may be the main body of a wall element.

The head is preferably shaped to co-operate with the first article to allow differential thermal expansion between the first article and the main part of the fastener.

The head may be of a generally conical configuration and may taper outwardly from a shank. The taper of the head may vary depending upon the difference in thermal expansion coefficients in the in plane and perpendicular directions in the first article. Where the first article has isotropic thermal expansion coefficients, the taper may be substantially 45° to the longitudinal axis of the shank. Where the first article has at least one anisotropic thermal expansion coefficients, the taper may curve inwards or outwards. The head preferably has an inner surface which, in use, faces inwardly of the combustor. The inner surface is preferably coated with a thermal barrier coating.

In another embodiment the section of the cooling pathway extending through the head is preferably angled relative to the section extending through the shank. In another embodiment, the cooling aperture extends generally parallel to, and preferably substantially coaxially with, the main longitudinal axis of the main part. The fastener preferably includes a spacer to space the first article from the second article. The main part conveniently extends through the spacer.

The spacer may be in the form of a further nut threadably receivable on the shank. The fastener may further include load spreading means arrangeable on the shank between said spacer and the first article. The load spreading means may comprise a washer.

According to another aspect of this invention there is provided a wall element for a wall structure of a gas turbine engine, the wall element comprising a main body and a fastener as described in paragraphs four to fifteen above to fasten the main body to an outer wall of the combustor.

The material from which the main body is formed may be a ceramic material, for example a ceramic matrix composite. An example of a suitable ceramic matrix composite is silicon carbide fibre/silicon carbide matrix composite other examples include alumina fibre/alumina matrix composites and mullite fibre/mullite matrix composites or mixtures of the foregoing. Such a material may have a temperature limit of greater than 1200°. The main body preferably has an inner surface which, in use, faces inwardly of the combustor. The inner surface of the main body is preferably coated with a thermal barrier coating.

The main body of the wall element may define at least one aperture to receive the fastener therethrough. The aperture may have a conical side which may taper inwardly from an inner surface of the main body to an outer surface thereof. Preferably, the shape of the side of the aperture corresponds to the shape of the head of the securing member. Advantageously, the head of the securing member, and the side wall of the aperture taper at substantially the same angle. This tapering of the head and the aperture provides the advantage in the preferred embodiment that the differential thermal expansion between the main body and the securing member is accommodated by the sliding of the head against the wall of the recess.

According to another aspect of this invention there is provided a wall structure for a combustor of a gas turbine engine, the wall structure comprising inner and outer walls, the inner wall comprising a plurality of wall elements as described in paragraphs sixteen to eighteen above.

According to another aspect of this invention there is provided a combustor for a gas turbine engine including radially inner and outer wall structures as described in paragraph nineteen above.

Embodiments of the invention will now be described by way of example only with reference to the accompanying drawings in which.

Figure 1:
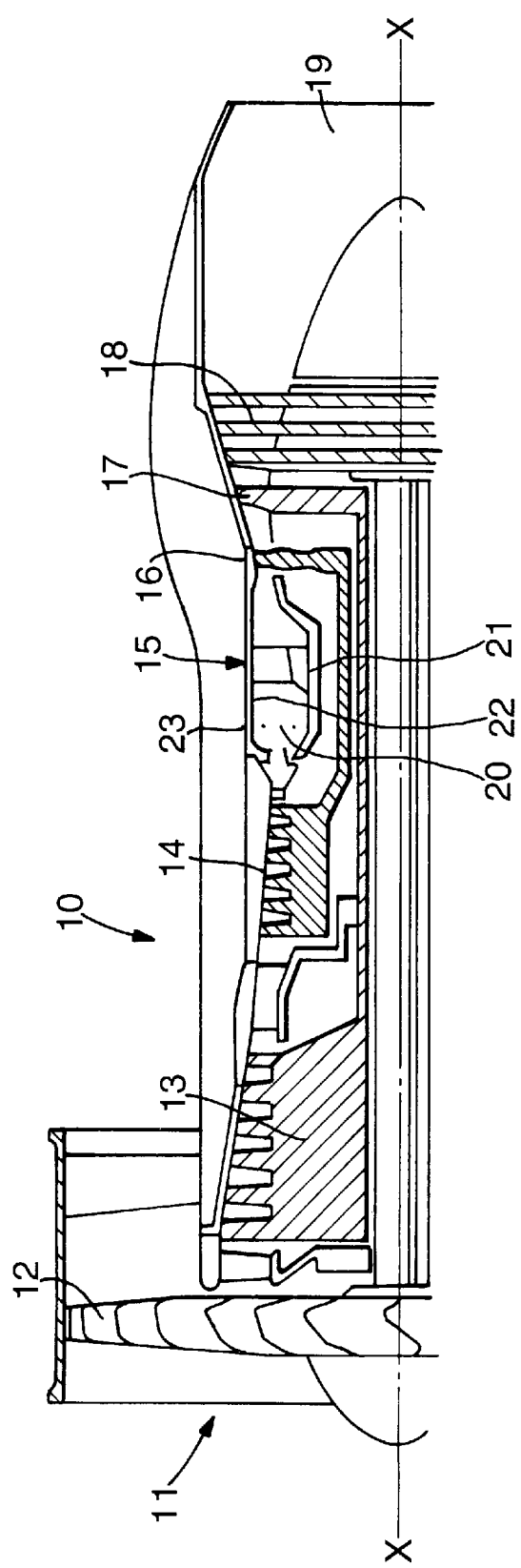
FIG. 1 is a schematic sectional view of the upper half of a gas turbine engine.

With reference to FIG. 1, a ducted fan gas turbine engine generally indicated at 10 has a principal axis X—X. The engine 10 comprises, in axial flow series, an air intake 11, a propulsive fan 12, an intermediate pressure compressor 13, a high pressure compressor 14, combustion equipment 15, a high pressure turbine 16, and intermediate pressure turbine 17, a low pressure turbine 18 and an exhaust nozzle 19.

The gas turbine engine 10 works in the conventional manner so that air entering the intake 11 is accelerated by the fan to produce two air flows: a first air flow into the intermediate pressure compressor 13 and a second air flow which provides propulsive thrust. The intermediate pressure compressor 13 compresses the air flow directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive, the high intermediate and low pressure turbine 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

Figure 2:
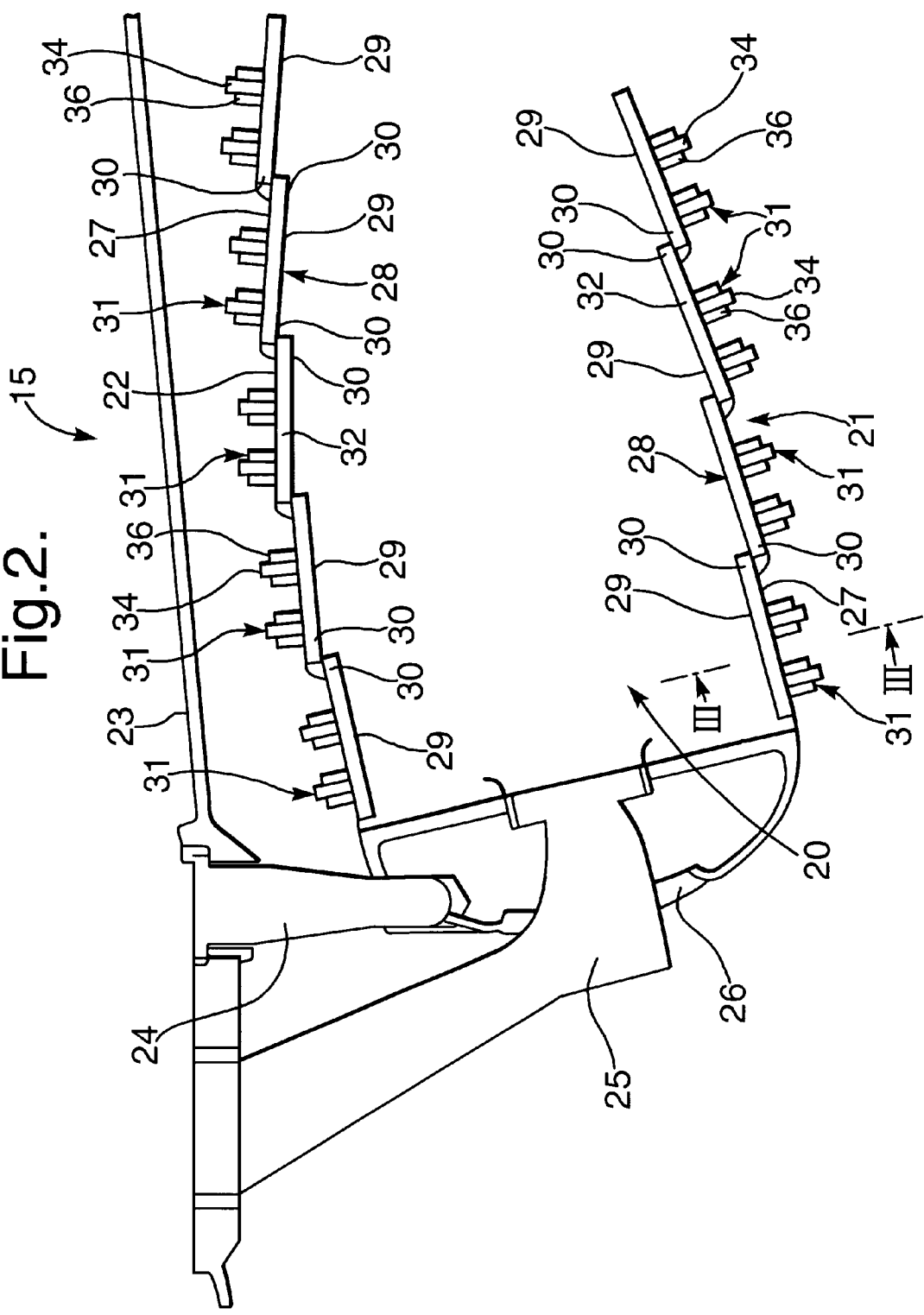
FIG. 2 is a sectional side view of a combustor for use in a gas turbine engine shown in FIG. 1.

Referring to FIG. 2, the combustor 15 is constituted by an annular combustion chamber 20 having radially inner and outer wall structures 21 and 22 respectively. The combustion chamber 20 is secured to a casing 23 by a plurality of pins 24 (only one of which is shown). Fuel is directed into the combustion chamber 20 through a number of fuel nozzles 25 located at the upstream end 26 of the combustion chamber 20. The fuel nozzles 25 are circumferentially spaced around the engine 10 and serve to spray fuel into air derived from the high pressure compressor 14. The resultant fuel/air mixture is then combusted within the combustion chamber 20. The combustion process which takes place within the chamber 20 naturally generates a large amount of heat. It is necessary, therefore, to arrange that the inner and outer wall structures 21 and 22 are capable of withstanding the heat.

The radially inner and outer wall structures 21 and 22 each comprise an outer wall 27 and an inner wall 28. The inner wall 28 is made-up of a plurality of discrete wall elements, each comprising a main body 30 in the form of a tile 29 and a plurality of fasteners 31 to fasten the respective tile 29 to the outer wall 27.

Figure 3:
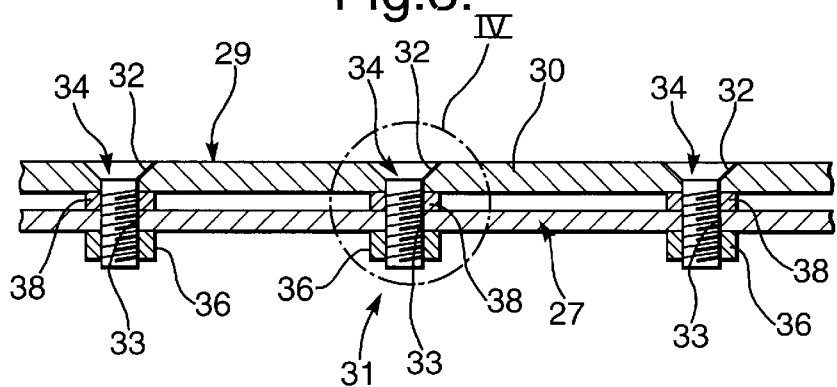
FIG. 3 is a view along the lines III—III in FIG. 2.

Referring to FIG. 3, there is shown a close-up of one of the tiles 29, which is formed of a ceramic material for example a ceramic matrix composite, which may be a silicon carbide fibre/silicon carbide matrix composite.

The tile 29 defines a plurality of conical apertures 32. Each fastener 31 comprises a main part in the form of a bolt 34 which is received through a respective one of the apertures 32. Each bolt 34 also extends through the outer wall 27 via a respective one of a plurality of apertures 33 defined therein and is secured to the outer wall 27 by first nuts 36 threadably received on the bolts 34.

A plurality of spacers in the form of a second nuts 38 are provided to space the tile 29 from the outer wall 27 and to secure the bolt 34 to the tile 29. A washer 39 (see FIGS. 4 and 5) is provided between the second nuts 38 and the tile 29 to spread the load applied to the tile 29 by the second nut 38. The washer 39 can be made of a material capable of withstanding high temperatures and which can deform plastically. An example of such a material is C263 or platinum. C263 provides the advantage of ageing in situ, thereby increasing its resistance to creep. Platinum provides the advantage of very good oxidation resistance. The bolts 34 extends through the second nuts 38 whereby the gap between the main body 30 of the tile 29 and the outer wall 27 allows desired air flow between the main body 30 of the tile 29 and the outer wall 27.

Figure 4:
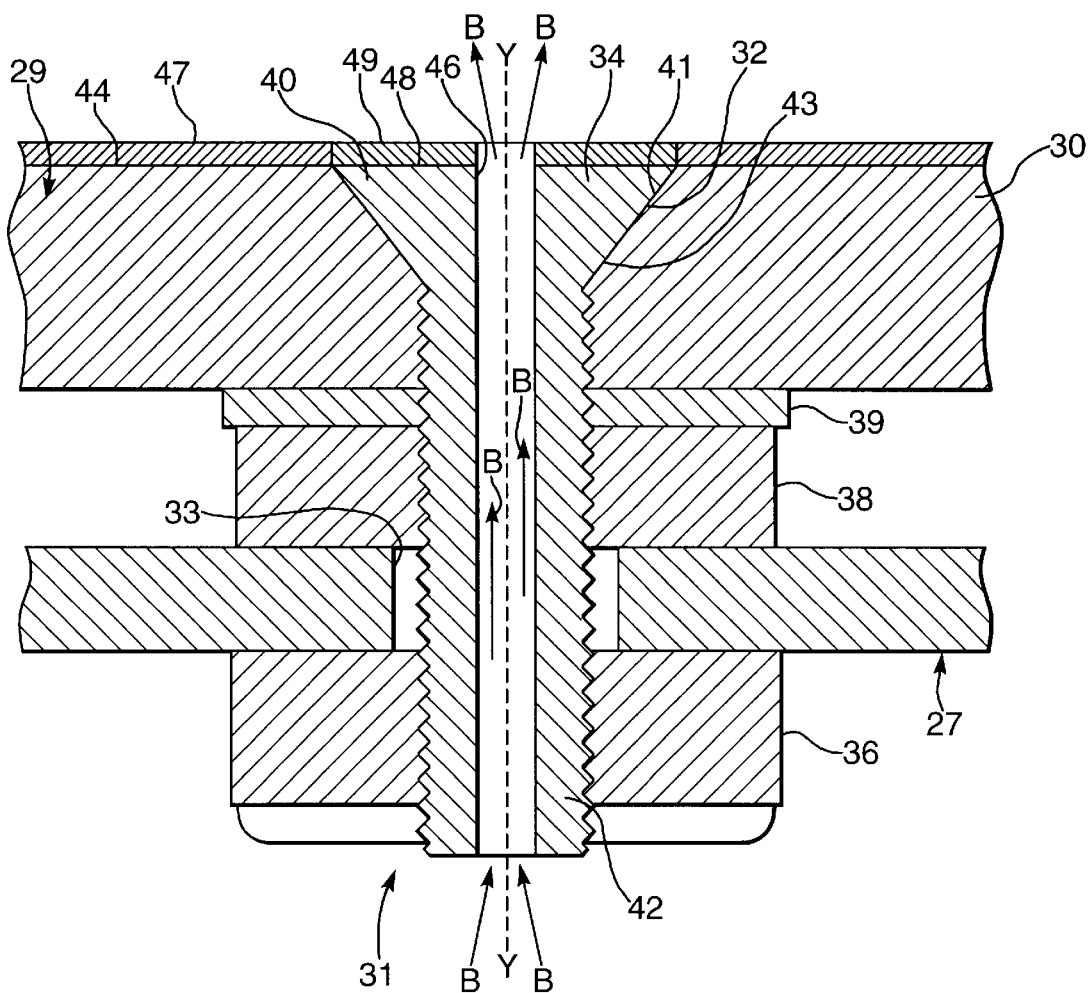
FIGS. 4 and 5 are close-up of the region marked IV in FIG. 3 showing different embodiments of the bolt.

Referring to FIG. 4, there is shown a close-up of the region marked IV in FIG. 3, which shows the bolt 34 in more detail.

The bolt 34 comprises a conical head 40 and a threaded shank 42. The conical head has a conical surface 41 and a planar base surface 48. The head 40 is shaped to be seated within the respective conical aperture 32 which has a corresponding conical surface 43. The surface 41 of the conical head 40 substantially wholly engages the conical surface 43 of the conical aperture 32.

Figure 6:
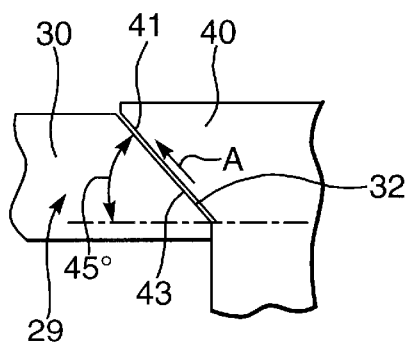
FIG. 6 is a close-up of the region marked V in FIG. 4.

The conical surface 41 of the conical head 40, and correspondingly, the conical surfaces 43 of the conical upertures 32 are arranged at an angle to the main axis of the bolt 34 of about substantially 45° (see FIG. 6).

The provision of a conical head 40 on each of the bolts 34 and a plurality of conical apertures 32 provides in the embodiments described herein with the advantage that it allows differential thermal expansion between the bolt 34, which is formed of a metallic material, for example, a metallic alloy such as Haynes 25 alloy or Mar-M002, and the tile 29, which is formed of the ceramic matrix composite. As shown in FIG. 6, on relative thermal expansion between the bolt 34 and the main body 30 of the tile 29, the conical surface 41 of the comical head 40 slides relative to the conical surface 43 of the conical aperture 32, as shown by the arrow A, thereby maintaining the bolt load on the main body 30 of the tile 29, thereby maintaining the main body 30 of the tile 29 secured in place.

When the or each bolt 34 is received through the respective aperture 32 of the main body 30, the shank 42 extends through one of the second nuts 38 and through an aperture 33 in the outer wall 27 and threadably receives thereon one of the first nuts 36. The aperture 33 is generally circular and has a greater diameter than the shank 42 of the bolt 34. This allows a degree of lateral movement of the shank 42 relative to the outer wall 27.

The first nuts 36 are screwed onto the threaded shank 42 and tightened against the outer wall 27 to a sufficient torque that allows the degree of lateral movement of the shank 42 relative to the outer wall 27. This potential for lateral movement compensates differential expansion between the tile 29 and the outer wall 27.

The bolt 34 has a main longitudinal axis Y—Y, and a cooling pathway in the form of a cooling aperture 46 extends through the bolt 34 generally wholly parallel to, and coaxially with, the axis Y—Y. The cooling aperture 46 allows air, as indicated by the arrows B to flow from the region outside the outer wall 27 through the bolt 34 via the cooling aperture 46 to the inside of the combustor 15, thereby cooling the bolt 34 and allowing it to withstand higher temperatures within the combustor.

The inner surface 44 of the tile 29 may be coated with a thermal barrier coating 47 for example zirconia, yttria stabilised zirconia, to allow the tile to withstand higher temperatures. Similarly, the inner face 48 of the bolt head 40 is also coated with a thermal barrier coating 49, e.g. zirconia, yttria stabilised zirconia, to increase its temperature capability further.

Figure 5:
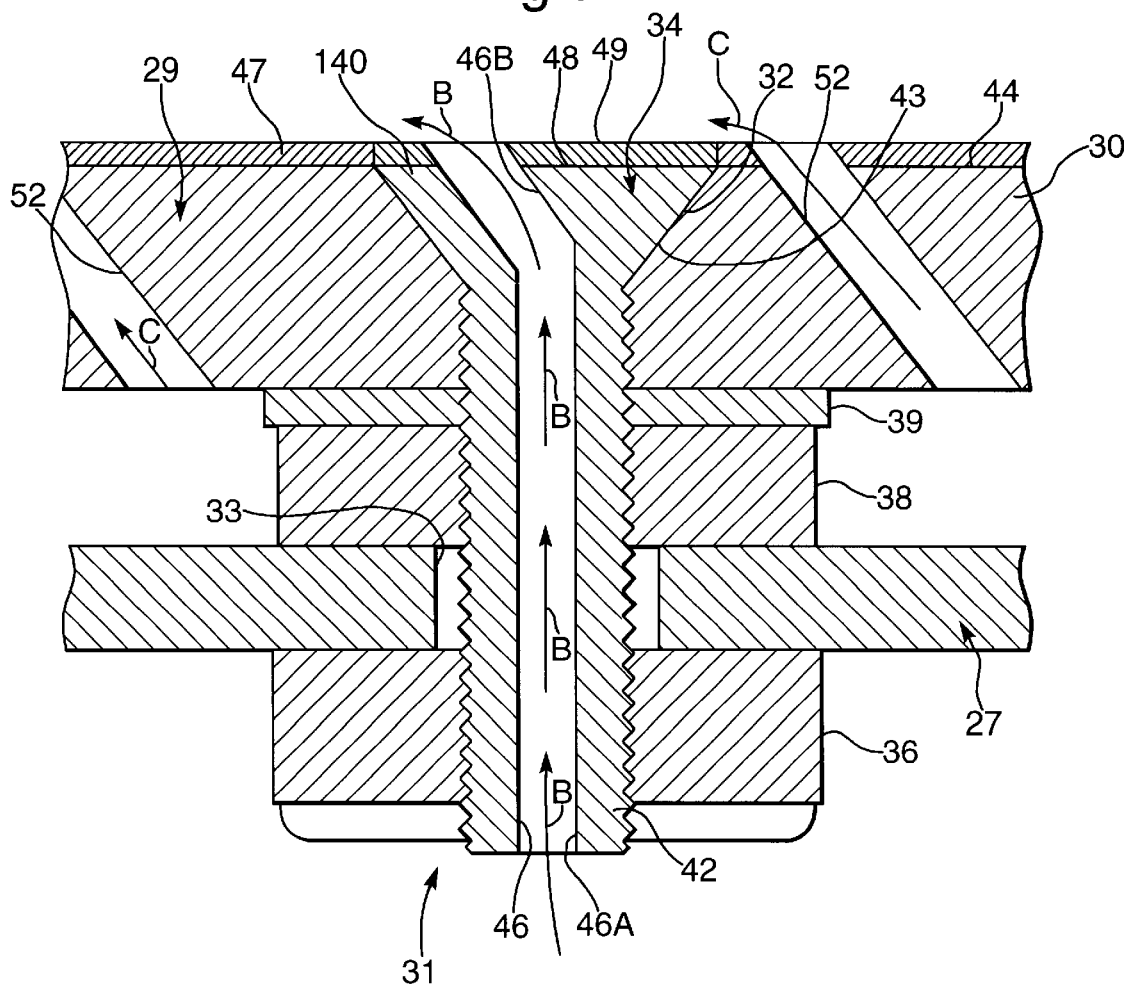

A further embodiment is shown in FIG. 5 includes all the same features as FIG. 4, and these have been designated with the same reference numeral. In the embodiment shown in FIG. 5, the main body 30 of the tile 29 defines a plurality of angled effusion holes 52 to provide cooling air over the inner surface of the tiles 29, as indicated by the arrows C. In this embodiment, the bolt 34 includes a head, which is designated 140 in FIG. 5 on the shank 42. The head 140 is generally the same as the head 40 shown in FIG. 4, but differs in that the cooling aperture 46 includes a first section 46A extending through the shank 42, and a second section 46B extending through the head 140. The first section 46A extends generally parallel to, and coaxially with, the main longitudinal axis x—x of the bolt 34. The second section 46B is angled through the head 140, to be parallel to the effusion holes 52 through the tile 29. In this way, the air passing through the cooling aperture 46 in the bolt 34, as indicated by the arrow B flows in the same direction as air flowing through the effusion holes 52.

The provision of the cooling aperture 46 has the advantage, particularly in the embodiment shown in FIG. 4 that it can be shaped to receive a key thereby providing a reaction force to the tightening of the nut 36 on the shank 42.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A wall structure for a combustion chamber of a gas turbine engine, the wall structure comprising an inner wall and an outer wall, the inner wall comprising a plurality of wall elements, each wall element comprising a main body and a ceramic fastener to fasten the main body to the outer wall of the combustion chamber, each fastener comprising an elongate main part which extends through the outer wall and the inner wall, wherein the main part of at least one of the fasteners defines a cooling pathway therethrough to allow the passage of a cooling gas through the main part of the fastener.

2. A wall structure according to claim 1 wherein the cooling pathway extends lengthways through the said main part.

3. A wall structure according to claim 1 including a securing member to secure the main part to the outer wall.

4. A wall structure according to claim 3 wherein the main part comprises a shank and a head, the pathway extending through the shank and through the head.

5. A wall structure according to claim 4 wherein the main part is in the form of a bolt and the securing member is in the form of a nut threadably receivable on the bolt.

6. A wall structure according to claim 4 wherein the head is shaped to co-operate with the inner wall to allow differential thermal expansion between the inner wall and said main part.

7. A wall structure according to claim 6 wherein the head is of a generally conical configuration and tapers outwardly from a shank, the taper of the head varying depending upon the difference in thermal expansion coefficients in the in plane and perpendicular directions in the inner wall.

8. A wall structure according to claim 7 wherein where the inner wall has isotropic thermal expansion coefficients, the taper is substantially 45° to the longitudinal axis of the shank, and where the inner wall has at least one anisotropic thermal expansion coefficient, the taper curves inwards or outwards.

9. A wall structure according to claim 6 wherein the head has an inner surface which, in use, faces an elevated temperature environment, the inner surface being coated with a thermal barrier coating.

10. A wall structure according to claim 4 wherein the main part has a main axis and the cooling pathway extends through the head and the shank generally parallel to the main axis.

11. A wall structure according to claim 4 wherein the main part has a main axis and the cooling pathway has a first section extending through the shank generally parallel to the main axis and a second section extending through the head at an angle to the mains axis.

12. A wall structure according to claim 4 including a spacer to space the inner wall from the outer wall, the main part extending through the spacer.

13. A wall structure according to claim 12 wherein the spacer is in the form of a nut receivable on the shank of the fastener.

14. A wall structure according to claim 13 including load spreading means arrangeable between the spacer and the inner wall to spread the load from the spacer onto the inner wall.

15. A wall structure according to claim 14 wherein the load spreading means is in the form of a washer.

16. A wall structure according to claim 1 wherein the ceramic material is a ceramic matrix composite.

17. A wall structure according to claim 16 wherein the ceramic matrix composite is selected from the group comprising silicon carbide fibre/silicon carbide matrix composite, alumina fibre/aluminium matrix composite and mullite fibre/mullite matrix composite.

18. A wall structure according to claim 1 wherein the inner wall and the outer walls are a radially inner wall and a radially outer wall respectively.

19. A wall structure according to claim 1 the main part of each one of the fasteners defines a cooling pathway therethrough to allow the passage of cooling gas through the main part of the fastener.

20. A wall structure for a combustion chamber of a gas turbine engine, the wall structure comprising an inner wall and an outer wall, the inner wall comprising a plurality of wall elements, each wall element comprising a main body and a fastener to fasten the main body to the outer wall of the combustion chamber, the main body of each wall element is formed from a ceramic matrix composite, each fastener comprising an elongate main part which extends through the outer wall and the inner wall, wherein the main part of at least one of the fasteners defines a cooling pathway extending lengthways therethrough to allow the passage of a cooling gas through the main part of the fastener from a region outside the outer wall to a region inside the inner wall.

* * * * *

UNITED STATES PATENT AND TRADEMARK OFFICE
CERTIFICATE OF CORRECTION

PATENT NO. : 6,718,774 B2  Page 1 of 1
DATED : April 13, 2004
INVENTOR(S) : Razzell, Anthony Gordon It is certified that error appears in the above-identified patent and that said Letters Patent is hereby corrected as shown below:

Column 5,
Line 18, claim 1 should read as follows:
-- A ceramic wall structure for a combustion chamber of a gas turbine engine, the ceramic wall structure comprising an inner wall and an outer wall, the inner wall comprising a plurality of wall elements, each wall element comprising a main body and a fastener to fasten the main body to the outer wall of the combustion chamber, each fastener comprising an elongate main part which extends through the outer wall and the inner wall, wherein the main part of at least one of the fasteners defines a cooling pathway therethrough to allow the passage of a cooling gas through the main part of the fastener. --

Signed and Sealed this

Twenty-fourth Day of August, 2004

JON W. DUDAS
*Director of the United States Patent and Trademark Office*